Patented May 31, 1932

1,861,165

UNITED STATES PATENT OFFICE

EDWARD J. RYAN, OF ST. LOUIS, MISSOURI, ASSIGNOR OF TWO-FIFTHS TO FRANK J. KUNA AND ONE-FIFTH TO HENRY J. LORANG, BOTH OF ST. LOUIS, MISSOURI

MASKING CREAM

No Drawing. Application filed September 19, 1931. Serial No. 563,901.

The general object of this invention is to provide a masking cream for use in protecting certain parts or surfaces of an object being painted or lacquered from accidentally having paint or lacquer applied to such parts or surfaces.

Thus in lacquering an automobile, where adjacent surfaces of the body have different colors, when one of said surfaces is being lacquered it is necessary to protect the adjacent surface from having any paint of that particular color applied thereto. It is also necessary to protect all of the glass in the car from having the lacquer sprayed thereon, as it is very difficult to remove, requiring the use of a metal scraper; and frequently this results in scratching, which renders it necessary to replace the glass thus defaced.

Ordinarily the glass and other surfaces of the car to be protected are covered with paper, which is taped in position. This is a slow and laborious method and somewhat expensive, owing to the cost of the tape used. Furthermore, after the removal of the tape and paper, all marks left by the tape have to be removed.

It is the object of my invention to enable a surface to be readily protected by the application of a temporary coating, which may be readily applied by the use of an ordinary paint brush, which coating, when applied, will be practically impervious to the action of sunlight or the atmosphere, will not run or crawl, will be equally stable on wood, metal or glass surfaces, and which may be readily removed by washing the surface to which it is applied.

My improved masking cream is composed of the following ingredients used in substantially the proportions indicated, to wit:

|  | Ounces |
|---|---|
| Glycerine | 6 |
| Whiting | 32 |
| Water | 8 |
| Salt | ½ |
| Ochre | ½ |

The proportions indicated may be varied within reasonable limitations without departing from the invention.

In mixing, I first add the salt to the water and let it dissolve. I then add the glycerine and subsequently the ochre, stirring thoroughly with each addition. I then add the whiting and stir until it is thoroughly mixed with the other ingredients.

The mass is slightly lumpy after mixing, but after standing about two hours it becomes smooth and creamy. If allowed to stand for about twenty-four hours, some of the liquid separates and collects on top of the mixture, but a little stirring is all that is necessary to cause this liquid to combine with the mixture.

The salt acts to prevent the glycerine from crawling or running on the surface to which it is applied, and it also acts as a cleaning agent when the cream is applied to glass.

The glycerine acts to prevent the penetration through the coating of any lacquer placed or sprayed thereon while being applied to an adjacent surface.

The function of the whiting is to thicken the glycerine and also to facilitate the removal of the cream from the surface to which it is applied. I preferably use sifted Spanish whiting.

The water, of course, is a diluent.

I preferably use French ochre, and its function is merely to impart a desirable color to the cream.

After being applied to the surface of an object, the masking cream will dry slightly, but will never completely dry, even if allowed to stand several days; and thus it will not crack and present fissures through which the applied lacquer can seep or penetrate to the protected surface. It is entirely stable, and even when the surface to which it is applied is vertically disposed, as would be the case, for instance, of the window or windshield of an automobile, the cream will not run or crawl on such surface. This is quite important, because, for example, in applying stripes of different colors to a surface, there is only a line of demarkation between the two surfaces, and if the masking cream applied to one surface should run beyond this line of demarkation, it is obvious that the striping would be defective.

On ordinary surfaces, either metal or wood, the masking cream can be readily removed by washing it. It is usually desirable to break up the coating by pressure of the fingers before washing. It may be removed in the same manner from glass surfaces; but ordinarily, it is found convenient to use a putty knife to scrape the coating off.

I claim:

A masking cream consisting of the following ingredients combined in substantially the proportions indicated, namely, glycerine, 6 ounces, water, 8 ounces, by measure; and whiting, 32 ounces, salt ½ ounce and ochre, ½ ounce, by weight.

In testimony whereof, I have hereunto set my hand.

EDWARD J. RYAN.